March 12, 1963   H. S. CAMPBELL   3,081,121
CONTROL MECHANISM FOR CARGO RELEASE DEVICES
Filed June 30, 1960   2 Sheets-Sheet 1
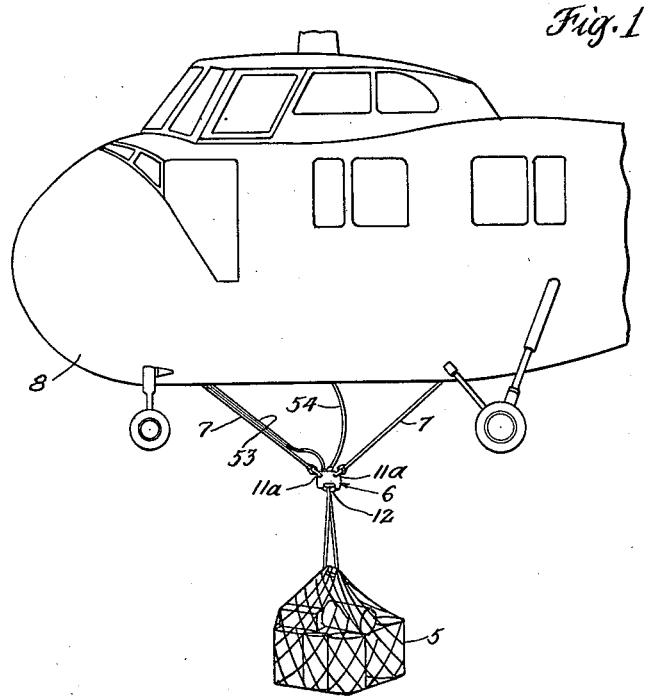
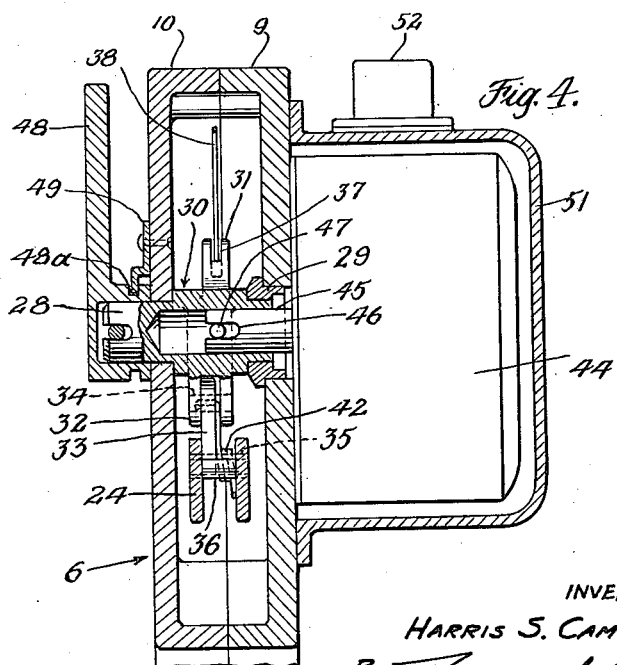
INVENTOR
HARRIS S. CAMPBELL
BY Raymond W Cotton
   ATTORNEY INVENTOR
HARRIS S. CAMPBELL
By Raymond W Cotton
ATTORNEY United States Patent Office 3,081,121
Patented Mar. 12, 1963

3,081,121
CONTROL MECHANISM FOR CARGO RELEASE DEVICES
Harris S. Campbell, Bryn Athyn, Pa., assignor to Eastern Rotorcraft Corporation, Doylestown, Pa., a corporation of Pennsylvania
Filed June 30, 1960, Ser. No. 40,016
14 Claims. (Cl. 294—83)

This invention relates to release devices for carrying slung cargo loads and is particularly concerned with improved mechanism for locking and releasing the load carrying portion of the device.

Cargo release devices of this nature are particularly useful in connection with carrying slung loads underneath helicopters. The release device is supported either directly or by means of cables on the helicopter structure and the slung load is attached to the helicopter through the medium of the release device. Preferably the controls for the release device include a power operated release which may be operated by a small control member mounted on the pilot's control stick. In this way the pilot has full control of the cargo release without removing his hand from the control stick. This power operated control may be an electrical device which would require only a push button control switch for actuation. In addition it is usually desirable to incorporate a manual control so that in the event of power failure an emergency release may be accomplished.

The mechanism for locking the supporting beam in carrying position should be positive in nature to resist accidental release under vibration or inertia forces. In addition it is preferred that this mechanism should not be sensitive to small motions but at the same time should not require large forces in the control mechanism to cause the opening action. It is a primary object of the present invention to provide improved mechanism for the locking and releasing of the load carrying portions of the device.

A more specific object of the invention is the provision of an internal control lever member which reacts with one of the load carrying elements of the device, which lever in turn is controlled by a over-dead-center linkage to secure the control lever in engaged position.

A further specific object of the invention is the provision of mechanism for actuating the release linkage either through a connection to an electrical device or through a manually operated connection, both connections utilizing a common shaft which supports the over-dead-center toggle linkage.

How the foregoing and other objects and advantages of the invention are accomplished will be clear from the following description of the drawings in which:

FIGURE 1 illustrates the release device of the present invention attached to a helicopter.

FIGURE 4 is an elevational view having certain parts in section taken generally in the direction of arrows 4—4, FIGURE 2.

Figure 2:
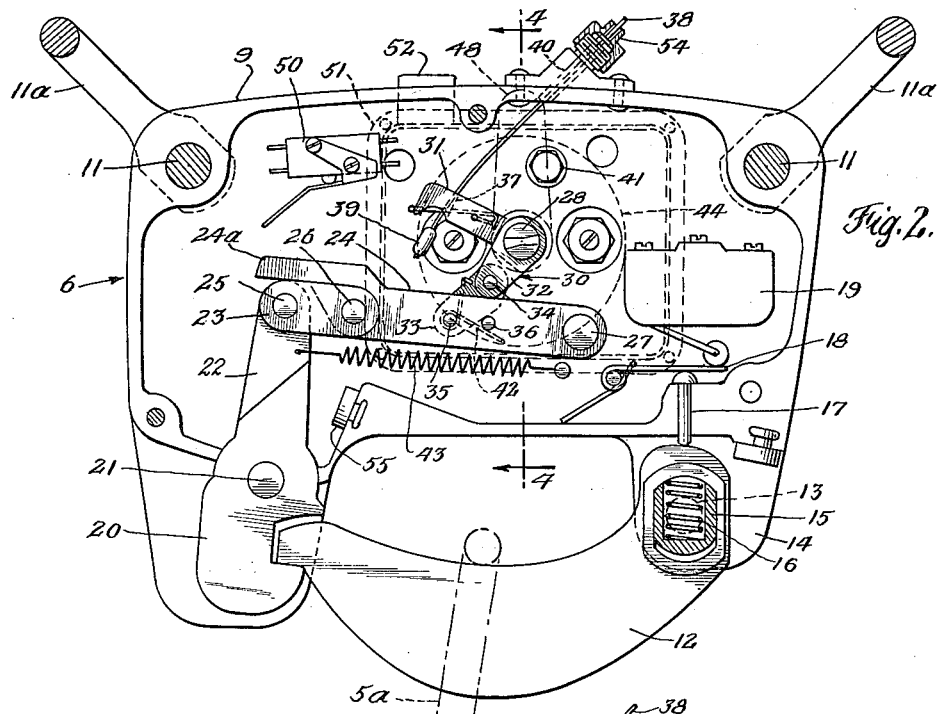
FIGURE 2 shows an elevational view of the release device with the cover removed to show the internal mechanism.

Referring to the drawings it will be seen that a load 5 is supported on a cargo release device 6 which in turn is attached by cables 7 to lifting apparatus in the form of helicopter 8. It will be seen that the load 5 can be attached to the device 6 after the helicopter has assumed a hovering position over the load. Deposit of the load at the desired location can be accomplished by releasing the device 6 to detach the load therefrom while the helicopter hovers just above the desired location. As will be evident the hook mechanism may be released either manually or electrically or by the automatic touchdown mechanism as desired.

Figure 3:
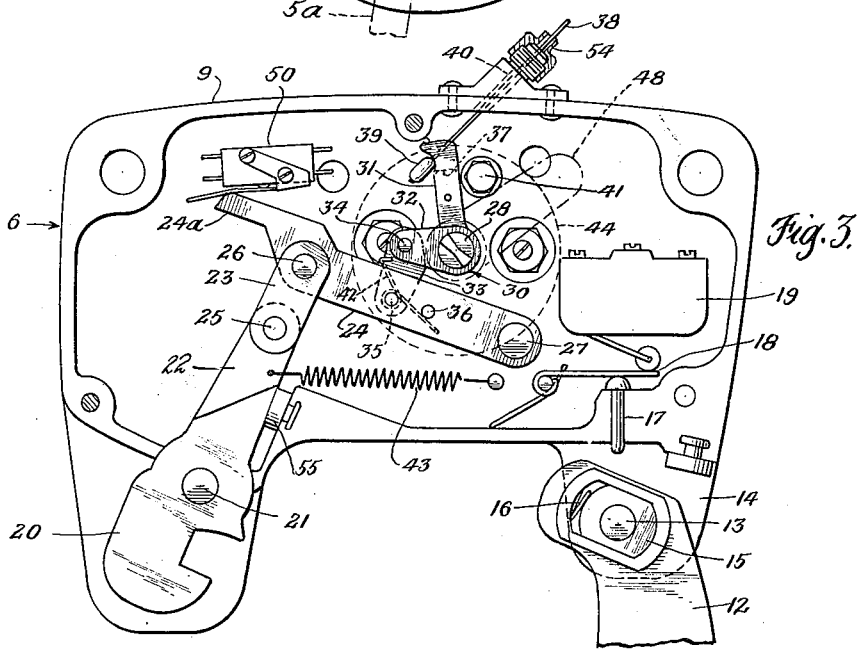
FIGURE 3 is a view somewhat similar to FIGURE 2 but showing various parts of the mechanism moved to release position.

The details of the mechanism of the release device 6 will be seen from FIGURES 2, 3 and 4. In the particular form of release device illustrated the main housing which forms the supporting structure for the mechanism consists of a rear casing 9 and a front casing 10. At the upper corners of the housing bolts 11 may be used to attach shackles 11a or other suitable fittings to support the release unit in load carrying position. At the lower side of the housing a load carrying beam 12 is supported by a trunnion or pivot structure 13 between a lug 14 attached to the rear casing 9 and a similar lug attached to the front casing 10. The pivot structure 13 is attached to a trunnion block member 15 which houses a spring 16 used to actuate the automatic touchdown release of the hook. This mechanism will be observed in FIGURE 2 wherein plunger 17 and actuator 18 cooperate to operate switch 19 used in the control of the automatic touchdown release mechanism.

When in the load carrying position the opposite end of beam 12 is supported by a load carrying latch member 20 as will be observed in FIGURE 2. The latch member 20 is mounted in the housing by means of pivot bolt 21. The upper end 22 of the latch member 20 extends inside the casings 9 and 10 and is connected by means of links 23 to the reaction lever member 24, pivots 25 and 26 being used to make the connection with the links 23. The lever member 24 is supported in the rear and front housings 9 and 10 by means of a pivot or trunnion 27. In the load carrying position of latch member 20 the pivot 26 is substantially in line with pivot members 25 and 27, the end portion 24a of the lever 24 serving to act as a limiting stop to determine the closed or load carrying position of the mechanism in which the lever member 24 reacts against the load transmitted from the latch member 20.

In order to provide an actuating mechanism for moving the reaction lever 24 away from load carrying position a pivot member 28 extends from the rear housing 9 through the front housing 10, a bushing 29 (see FIGURE 4) being provided to assist in the mounting. A bellcrank member 30 having arms 31 and 32 attached thereto may be integrally connected to the shaft member 28 in a fashion so that the ends of the bellcrank member 30 act as shoulders to position the shaft endwise in the housing. A connecting link 33 extends between the arm 32 and the lever 24, being connected to these parts by pivot pins 34, 35. It will be noted that in the load carrying position shown in FIGURE 2 the link 33 is located slightly over dead center relation, stop pin 36 being provided to limit the travel of the arm 32 and link 33 in this direction. In this position the lever 24 is locked in load carrying position thus preventing inadvertent opening due to vibration or inertia loads in a transverse direction to the lever 24.

Arm 31 is provided with a slot 37 at its end to accommodate a manual release cable 38 which has a fitting 39 attached to the end suitable for engaging the end of arm 31 when the cable is pulled to actuate the mechanism for release purposes. The cable 38 extends through the aperture 40 to the outside of the housing where it may be carried through flexible sheath member 54 to a suitable location for connection to the operator's control. A stop member 41 is attached to the rear case 9 in a position to limit the travel of the arm 31 to the open or release position of the mechanism. A torsion type spring 42 reacts against the toggle link 33 in a direction to urge the linkage to the closed position. A tension spring 43 reacts between the upper end of the latch mechanism 20 and the case 9 in a direction to urge the latch toward open position.

As shown in FIGURE 4 a rotary solenoid device 44 is mounted on the outer surface of the rear casing 9 with its shaft 45 extending through the casing 9 to the inside, shaft 45 being concentric with pivot member 28. The shaft 45 is provided with a slot 46 which engages pin 47 so that rotation of shaft 45 can cause rotation of the bellcrank member 30. Thus the solenoid when energized causes opening of the release mechanism. If desired lost motion can be provided in the slot 46 so that the bellcrank member 30 can be moved by actuating the arm 31 without causing movement of the solenoid shaft 45. The solenoid construction itself forms no part of the present invention. An example of a suitable type of solenoid is illustrated in U.S. Patent 2,430,940.

The end of pivot member 28 extending through the front casing 12 is notched to provide means for engagement by the handle 48. Handle 48 is retained in position by clip 49 attached to the front casing 10 and arranged to engage in groove 48a in the boss of the handle 48.

An electrical switch 50 is supported on the back casing 9 in position so that the actuator on the switch is contacted by the end 24a of the lever 24 when it is moved to the open or released position. Switch 50 may be used to break the circuit to the solenoid when the mechanism has moved to open position and if both normally open and normally close contacts are provided in the switch 50 it can also be used to cause lighting of an indicator light to show the hook in open position. The electrical connections and circuits are not a part of the present invention per se. A cover member 51 is provided to protect the solenoid 44 and enclose the electric wiring between the solenoid and the switches. An electrical connector 52 is mounted on the cover member 51 and provides for connecting the electrical conductors leading to the electrical control system. In a normal helicopter installation an electrical cable 53 (see FIGURE 1) would be provided and also a flexible sheath member 54 through which the cable 38 extends. In this way the operating controls are extended to the operator's compartment.

As has been mentioned the load carrying position of the mechanism is shown in FIGURE 2 where it will be seen that sling member 5a is supported on the load beam 12, one end of which is supported by the notch 20a of the load carrying latch 20. The reaction beam 24 is positioned with the pivots 25, 26 and 27 substantially in alignment to carry the load without producing an opening moment. The reaction lever 24 is held positively in this position by means of the linkage 32 and 33 which reacts through the pivot member 28 into the casing parts 9 and 10. It will be noted that this locking linkage is also toggled at the center and retained in this position by the spring 42.

To open the mechanism to release the load by the manual cable 38 the operator applies the load to cable 38 causing the arm 31 to be moved to the position shown in FIGURE 3. This movement of the arm causes rotation of pivot member 28 and moves the linkage formed by the arm 32 and link 33 in a fashion which raises the reaction lever 24 into position to permit swinging of the load carrying latch member 20. As will be observed in FIGURE 3 the latch member then moves until it contacts the stop 55 where the mechanism is in the open position and permits the load beam 12 to drop away and release the sling member 5a. Spring 43 retains the mechanism in this position until it is ready to be closed to carry another sling load. In the open position the pivots 21, 25 and 26 are approximately in alignment thus preventing the mechanism from being closed by movement of the lever 39 or the external handle 48. Closing of the hook is accomplished by swinging the end of the beam 12 to engage the projection 20b of the latch member 20 thereby causing rotation of the latch member in the closing direction, such motion causing closing movement of the lever 24 and the toggle mechanism. At a certain point during the closing motion the spring 42 assumes command over the spring 43 and the mechanism closes completely and latches into carrying position.

If desired the release mechanism may also be opened by the ground operator moving the external handle 48 which rotates the pivot member 28 and thus causes the same movement to occur as when the arm 31 is moved by the cable 38.

Likewise the shaft 28 may be rotated by energizing the solenoid 44 by means of a suitable electrical switch under the control of the operator. Energization of the solenoid device 44 causes rotation of the solenoid shaft 45 which in turn can transmit its rotation through pin 47 to pivot member 28 and thus rotate the arm 32 and link 33 in the direction to open the mechanism. The electrical release mechanism may also be actuated automatically by depositing the load on the ground thus causing switch 19 to complete the automatic touchdown circuit and thus energizing the solenoid 44. An arming switch may be provided in the system to place the automatic touchdown circuit under the selective control of the operator.

From the foregoing it will be seen that I have provided an improved mechanism for the control of a cargo release device. The mechanism herein described represents improved construction over the general mechanism disclosed in my Patent 2,904,369 relating to release devices. By means of a reaction lever with a locking linkage connected to it a more positive latching mechanism is provided. This additional linkage not only reduces the possibility of inadvertent release of the mechanism due to vibrational or inertia loads but also reduces the operating sensitivity by requiring first control movement for unlocking the toggle linkage and then continued movement to move the reaction lever. As a result a more reliable mechanism is produced and at the same time reduced release load operating over a greater distance is available thus giving greater effectiveness to the power medium being used.

I claim:

1. A cargo engaging and release device having a supporting structure, a load carrying beam pivotally supported on said structure, latch mechanism for releasing said beam including a lever member pivotally supported on said structure in a position to carry a compression load while in closed load carrying position, a pivot member supported on said structure at a point offset above said lever, an arm attached to said pivot member, a link having one end pivoted to the end of said arm and the other end pivoted to said lever member, said link and said arm lying in substantially aligned over-dead-center relation when the lever is in closed position, a manually operable element attached to said pivot member, rotation of said pivot member causing swinging of said arm member away from dead center relation to move said lever away from load carrying position thereby allowing said beam to move to load release position.

2. A cargo release device having a supporting structure, a load carrying beam pivotally supported on said structure, latch mechanism including a lever member pivotally supported on said structure, a load transfer element attached to said lever to transmit a load axially through said lever member when in load carrying position, a pivot member supported on said structure at a point offset from said lever member, an arm attached to said pivot member, a link having a pivotal attachment to said arm and a pivotal attachment to said lever member, said link and said arm lying in substantially aligned relation to provide an over-dead-center condition when the lever member is in closed position, means connected to said pivot member for causing rotation thereof to move said arm out of aligned position with respect to said link and causing said lever to move to a position which releases said beam from load carrying position.

3. A cargo release device constructed in accordance with claim 2 in which said means connected to said pivot member include an electrically operated device.

4. A cargo engaging and release device having a supporting structure, a load supporting element having a pivot mounting it on said structure, said pivot being located between the load supporting end and the reaction end, a reaction lever pivoted on said structure having a part reacting against the reaction end of said load supporting element to prevent movement thereof, a pivot member supported on said structure in offset relation to said lever, an over-dead-center link attached to said pivot member and engaging said lever to retain it in position to react with said load supporting element, means to rotate said pivot member to move it out of over-dead-center position with said lever to allow said load supporting element to move to release position.

5. A cargo engaging and release device constructed in accordance with claim 4 in which said means to rotate said pivot member include an electric actuator.

6. A cargo carrying and release device constructed in accordance with claim 4 in which said means to rotate said pivot member include a rotary solenoid device mounted on said frame in co-axial relation with said axle member.

7. A cargo engaging and release device having a supporting structure, a load supporting element pivotally mounted on said structure, a reaction and release lever pivoted on said structure, said lever having a part reacting against the end of said load supporting element when in load carrying position, a pivot member mounted in said structure in offset relation to said lever, toggle linkage having one end connected to said pivot member and the other end connected to said lever, said linkage being in over-dead-center relation when said lever is holding said load supporting element in load carrying position, means attached to said pivot member to rotate it to cause said linkage to move away from over-dead-center position to cause movement of said lever and release of said load carrying element.

8. A cargo engaging and release device having a supporting structure, a load supporting element pivotally mounted on said structure, a lever member pivoted to said structure and having a pivotally mounted link connecting it to the end of said load supporting element to form an over-dead-center toggle to retain said load supporting element in load carrying position, a pivot member mounted on said structure in offset relation to said lever member, an arm attached to said pivot member, a link pivotally attached to said arm and to said lever member to form an over-dead-center toggle linkage to retain said lever member in loaded position, means connected to said pivot member to cause rotation thereof to move said arm and link away from dead center position and thereby cause movement of said lever and link and said load supporting element to release position.

9. A cargo engaging and release device constructed in accordance with claim 8 in which a sling engaging beam is pivotally supported on said structure at one end, the other end of said beam being supported by said load supporting element when in load carrying position.

10. A cargo engaging and release device constructed in accordance with claim 8 in which a stop part is provided on said lever member to determine the over-dead-center position of said linkage.

11. A cargo engaging and release device constructed in accordance with claim 8 in which a spring is provided to rotate said pivot member and said toggle linkage to the over-dead-center position.

12. A cargo engaging and release device constructed in accordance with claim 8 in which a spring is provided to react between said load supporting element and said structure to urge said element to release position.

13. A cargo engaging and release device having a supporting structure with a pair of spaced side plates, a load supporting element pivotally mounted on said plates, a reaction and release lever pivoted on said plates, said lever having a part connected thereto to react against the load supporting element to retain it in load carrying position, a pivot member mounted in said plates in offset relation to said lever, toggle linkage between said plates having one end connected to said pivot member and the other end connected to said lever, a rotary solenoid device mounted on the outer side of one of said side plates and connected to one end of said pivot member, a manual release handle on the outer side of the other of said side plates connected to the other end of said pivot member.

14. A release device constructed in accordance with claim 13 in which an arm is attached to said pivot member between said side plates, and a tension element engages said arm for rotating said pivot member in the release direction.

References Cited in the file of this patent

UNITED STATES PATENTS

| | | |
|---|---|---|
| 2,598,245 | Firman | May 27, 1952 |
| 2,610,887 | Firman | Sept. 16, 1952 |
| 2,868,580 | Stevens et al. | Jan. 13, 1959 |
| 2,868,581 | Minty et al. | Jan. 13, 1959 |
| 2,904,369 | Campbell | Sept. 15, 1959 |